Nov. 26, 1957  G. S. TRIMBLE, JR., ET AL  2,814,453
AIR BASE
Filed March 14, 1952  4 Sheets-Sheet 1

INVENTORS
GEORGE S. TRIMBLE, JR.
RICHARD K. WENTZ,
NICKOLAUS W. MAGYAR,
BY
ATTORNEY

Nov. 26, 1957  G. S. TRIMBLE, JR., ET AL  2,814,453
AIR BASE
Filed March 14, 1952  4 Sheets-Sheet 2

INVENTORS
GEORGE S. TRIMBLE, JR.
RICHARD K. WENTZ,
NICKOLAUS W. MAGYAR,
BY
ATTORNEY

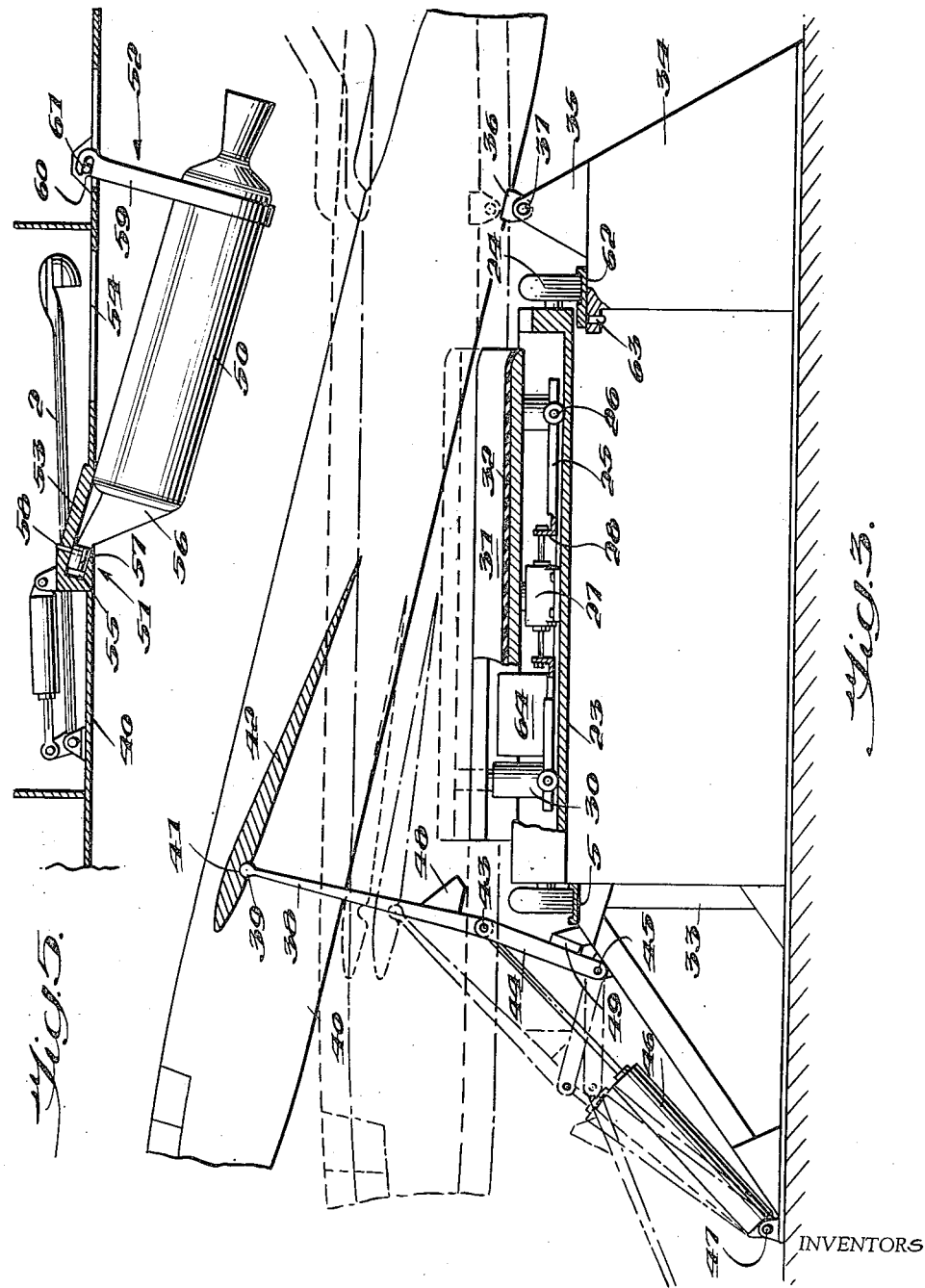

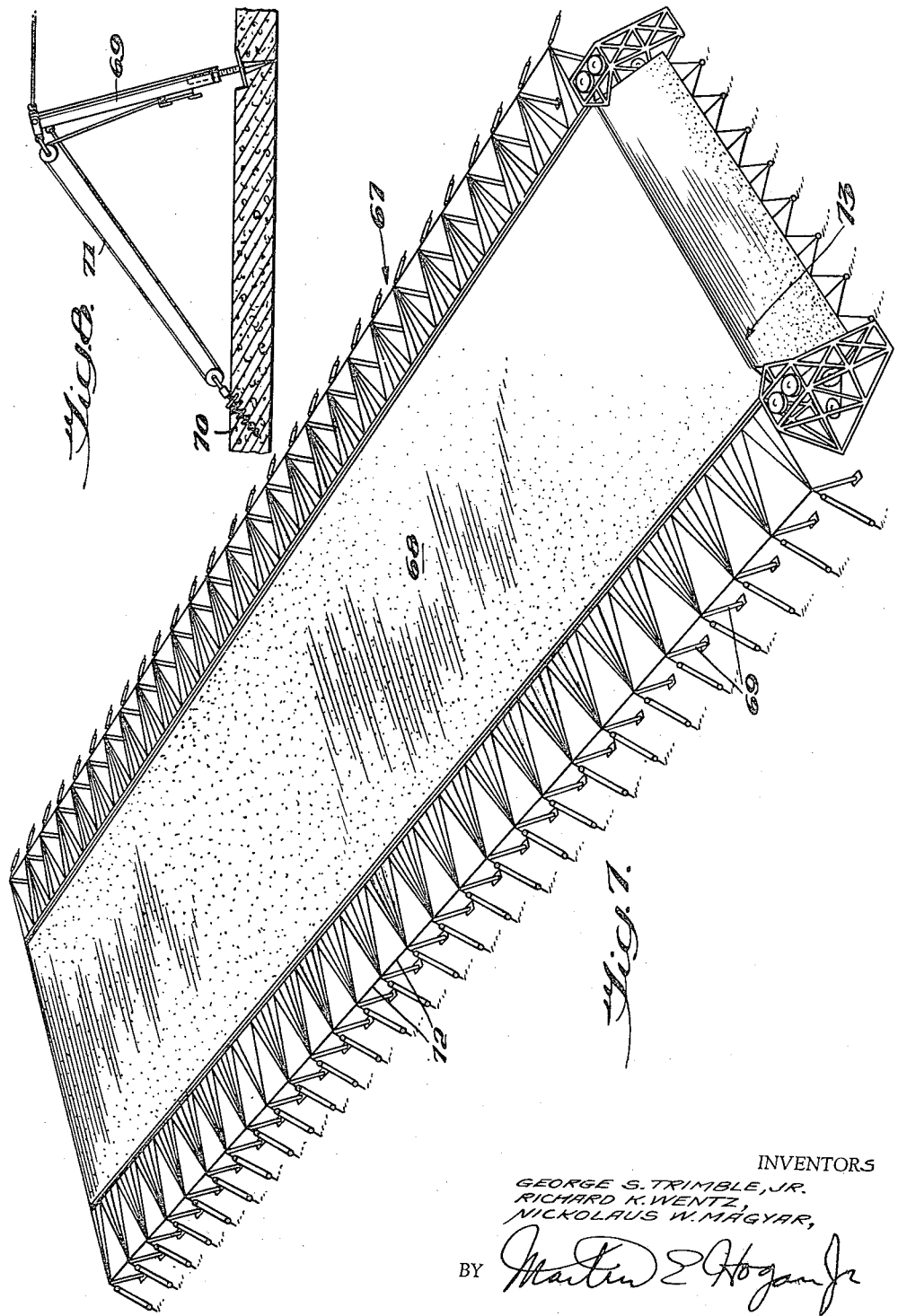

United States Patent Office 2,814,453
Patented Nov. 26, 1957

2,814,453

AIR BASE

George S. Trimble, Jr., Towson, and Richard K. Wentz and Nickolaus W. Magyar, Baltimore, Md., assignors to The Glenn L. Martin Company, Middle River, Md., a corporation of Maryland Application March 14, 1952, Serial No. 276,526

8 Claims. (Cl. 244—63)

This invention relates to a novel, high performance airplane, together with means for landing and launching such an airplane in a relatively restricted space.

In the past few years, the speed and range requirements for aircraft, particularly bombing aircraft, has been steadily advancing. As a result, the fuel required to obtain the desired high performance has become relatively greater and greater. In order to carry the fuel necessary to obtain the desired performance, it has been necessary to make the airplane larger and heavier and has required use of stronger and heavier landing gear. This in turn has necessitated the construction of larger landing fields and has made it both impractical and economically unfeasible to provide for the wide dispersal of such aircraft necessary to adequately protect the nation's air strength against enemy attack. It can be shown that if the conventional gear is eliminated from such an aircraft, the gross weight can be reduced to substantially two-thirds of that of an airplane of equal performance but provided with the usual landing gear. This would obviously result in enormous savings, both in the cost of the airplane itself and in the cost of maintaining and operating such an airplane.

It is an object of this invention to provide such an airplane in which the conventional landing gear, with its troublesome weight penalty, has been eliminated, together with means for safely landing and launching such airplanes in relatively rapid sequence in a relatively restricted space.

A further object is to provide an airplane adapted to be landed directly on the underside of its fuselage upon the surface of a resilient mat, together with means for bringing such an airplane to rest on the mat.

A further object is to provide a means for quickly removing an airplane from the surface of the mat and transferring it to an out-of-the-way position so that subsequent landings of other airplanes may be permitted.

Another object is to provide means adjacent the landing mat for rapidly and safely launching such an airplane without requiring the usual take-off run.

Another object is to provide means for readily transferring an airplane from the mat to the launcher.

Still another object is to provide such an arrangement wherein the various components are readily portable, and which, when arranged in operative condition, requires but relatively little clear area.

Another object is to provide landing and launching means for an airplane, of such size and relatively low cost that it is both economically and physically practical to provide such a system for use with a relatively small number of airplanes, thus permitting the wide dispersal of aircraft which is so desirable in military operations.

Further objects will be apparent from the following description and drawings.

In the drawings:

Fig. 3 is a side view of one of the launchers.

Fig. 5 is a fragmentary sectional view through the rear portion of the fuselage of the airplane.

Fig. 7 is a perspective view of an alternate form of landing mat and

Fig. 8 is a fragmentary view showing details of construction of the arrangement shown in Fig. 7.

Figure 1:
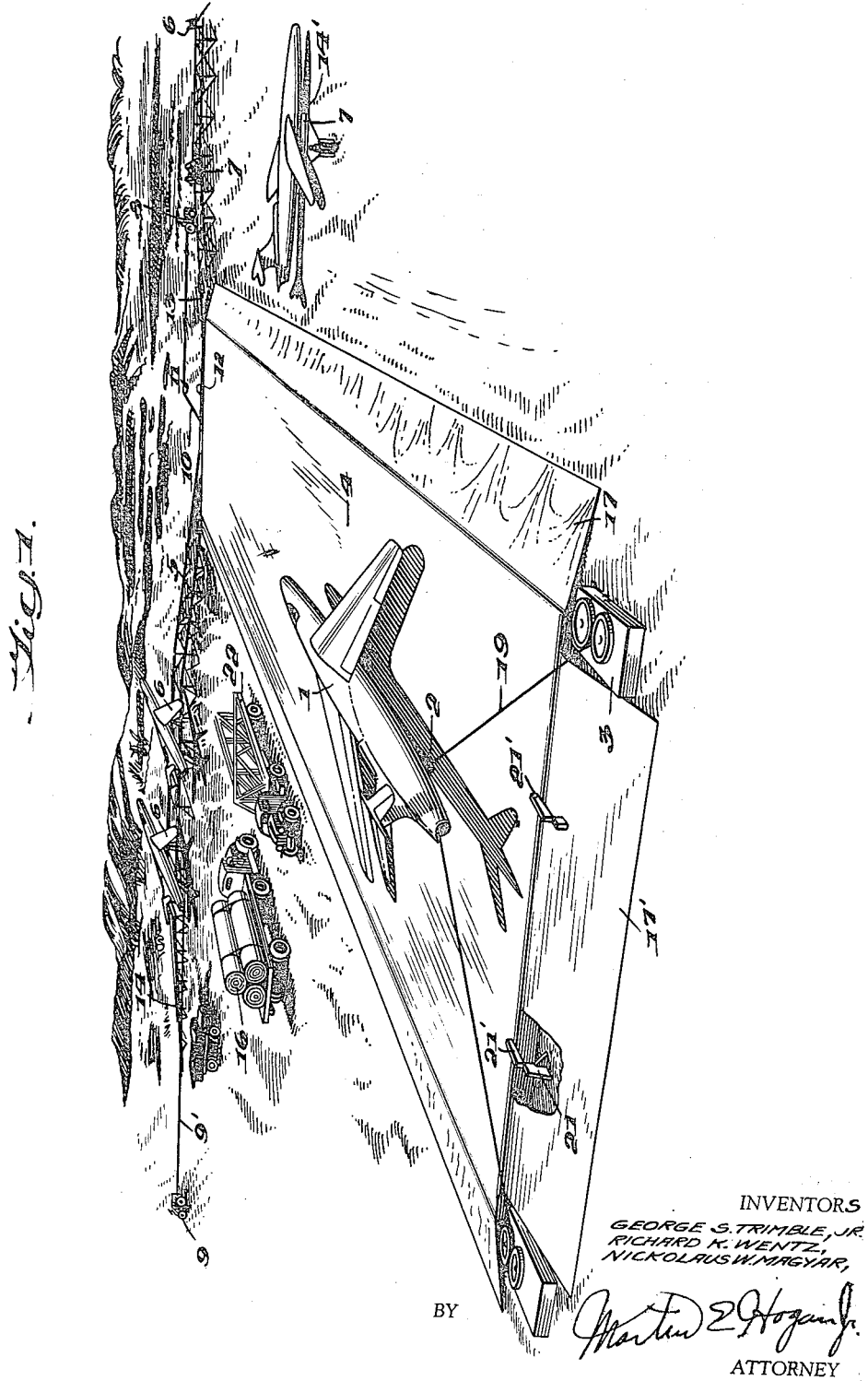
Fig. 1 is an over-all perspective view of an airbase showing the landing mat and launching device together with their associated equipment.

The airplane 1, shown in Fig. 1, is illustrated as being a high performance, relatively long range, jet propelled bomber which, unlike conventional aircraft lacks the usual landing gear and which is intended to be landed directly on the smooth underside of its fuselage on a suitable mat. The only landing gear required on the airplane is a retractable arresting hook 2 similar to those commonly used on carrier based aircraft. Preferably the hook will be of the roller type shown and described in copending application Serial No. 79,061, now U. S. Patent No. 2,602,613 of July 8, 1952.

As best shown in Fig. 1, the means for landing the airplane 1 comprises a conventional arresting gear 3 which may be of the same type as is at present used on aircraft carriers and which is adapted to engage the arresting hook 2 carried by the aircraft to quickly bring the latter to rest upon the resilient landing mat 4. Adjacent the end of the mat opposite the arresting gear 3 is a trackway 5 running to one or more zero-length launchers 6. Each of a plurality of dollys 7, adapted to run along the track, is arranged to receive an airplane after it has come to rest on the landing mat and to transfer it to one of the launchers. Portable winches are preferably provided in conjunction with this arrangement, one such winch 8, being used to pull the airplane from the landing mat onto a dolly and others, as indicated at 9, being employed to move the dollys along the trackway 5. In order that the winch 8 may be offset laterally from the mat, its cable 10 is preferably reeved about a guide sheave 11 suitably supported in substantial alignment with the center line of the mat. Winches 9 will preferably be aligned with the trackway, one opposite each end thereof.

The portion of the track immediately adjacent the end of the landing mat is located substantially at ground level as shown at 12, while inclined track portions 13 lead up to the level required by the launchers. Beyond the launchers, the track is preferably again inclined downwardly as at 14 so that, if desired, a dolly, together with the aircraft carried thereby, may be run out onto the ground and towed by any suitable means, as indicated at 14′, to any desired point.

Figure 2:
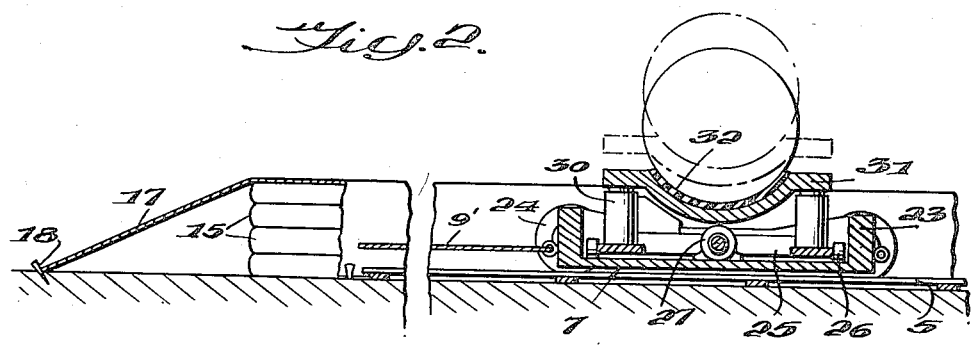
Fig. 2 is a fragmentary end view showing the landing mat and certain of the handling mechanism provided.

As indicated in Fig. 2, the landing mat itself may be made up of a plurality of inflatable mattress sections 15 stacked together to give the required over-all size and thickness and of such dimensions that, when collapsed, they may be individually rolled up as at 16 for transport on a suitable truck. Over the top of the mattress sections a strong fabric cover 17 is stretched and is adapted to have its outer edges pegged to the ground as indicated at 18. The arresting cable 19 of the arresting gear is arranged to be stretched between suitable sheaves 20 and, in order to initially support the cable at the desired height above the level of the mat, a pair of callapsible posts 21 may be provided. These posts are so arranged that as soon as the hook on the aircraft has engaged the cable, the upper portion 21' of the posts will topple over forwardly so as not to interfere with the desired snubbing action of the arresting gear. Preferably cover 17 will also be extended beyond the approach end of the mat so as to form an upwardly inclined ramp portion 17' to prevent snagging the hook if the plane approaches at too low a level.

As indicated in Fig. 1, the track 5 is also built up of readily detachable sections 22, which may be transported on suitable trucks or trailers. Similar provisions will likewise be made for disassembling and transporting the launchers, arresting gear, and other associated equipment.

Turning now to Figs. 2 and 3, it can be seen that each dolly 7 comprises a main frame 23 provided with wheels 24 adapted to run along the track 5 and provided with suitable releasable attachments for the cables 9' of winches 9. Mounted for limited transverse movement relative to the frame 23 is a carriage 25 provided with rollers 26. A suitable linear actuator 27 is rigidly fixed to the frame 23 and connected as at 28 to the carriage 25. Supported by a plurality of jacks 30 from the carriage 25 is a cradle 31 having its upper surface shaped to conform to the under portion of the fuselage of the airplane and padded as at 32 to prevent damage thereto. With this arrangement it is obvious that the cradle 31 may be raised and lowered somewhat relative to the track and may be moved to a limited extent transversely thereof.

Figure 4:
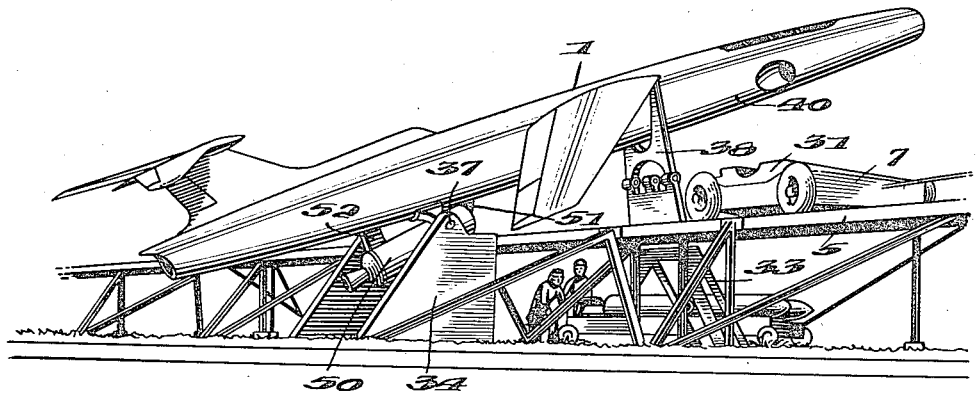
Fig. 4 is a perspective view of an airplane supported in a launcher in readiness for launching.

Launchers 6 are constructed as best shown in Figs. 3 and 4. At each launcher the track 5 is supported by suitable front and rear supports 33 and 34. Supports 34 are provided with a pair of generally triangular posts 35 adapted to straddle and to be pivotally connected to a pair of retractable pivot brackets 36 depending from the rear portion of the airplane. The pivotal connection between brackets 36 and posts 35 is brought about by means of shear pins 37. These pins are designed so as to support the dead weight of the aircraft when in launching position but are adapted to shear under the thrust loads which occur during the launching operation.

The front portion of the aircraft is adapted to be supported by a U-shaped member 38 having the upper ends of its arms formed as ball-like members 39 adapted to straddle the fuselage 40 and to engage within suitable sockets 41 formed in the under surface of the wings 42 closely adjacent the sides of the fuselage. Member 38 is pivoted as at 43 to the free end of a bifurcated link 44 swingably carried as at 45 from the track support 33. Ram 46, pivoted at 47 to the support 33, is provided for swinging the link 44 about its pivot 45. Member 38 preferably carries a suitable stop 48 adapted to engage the link 44 in certain positions of the parts to limit relative swinging movement. Similarly, a stop 49 may be provided on the support 33 to limit the swinging movement of the link 44.

As shown in Fig. 4, an auxiliary reaction motor in the form of a jato unit 50, of large thrust capabilities, is adapted to be detachably secured as at 51 and 52 to the under side of the fuselage during the launching operation. Connections 51 and 52 are preferably so arranged that the jato unit 50 will be automatically released from the plane as soon as it has expended its charge. While many arrangements could be devised to obtain this result, the particular means shown in Fig. 5 comprises a pair of supports 53 rigidly carried by the aircraft on opposite sides of the slot 54 through which hook 2 is retractable, each support having formed therein a cylindrical bore 55 sloping downwardly and rearwardly parallel to the desired line of thrust of the unit 50. The forward end of the unit 50 is provided with a pair of brackets 56 each terminating in a piston 57 adapted to be inserted into the corresponding bore 55. A shear pin 58 may be employed for holding the parts in their proper relationship prior to firing. The opposite end of the unit 50 is provided with a hanger 59 having its upper end slotted as at 60 to slidably engage a pin 61 rigid with the fuselage. With this arrangement, as soon as the jato unit is fired the thrust will cause pins 58 to shear, permitting the pistons 57 to thereafter transmit the thrust directly against the ends of the cylinders 55. However, when the unit begins to burn out, after two or three seconds, the thrust will no longer be sufficient to prevent the piston 56 and hanger 59 from sliding rearwardly and downwardly under the influence of aerodynamic drag and gravity to release the unit from the plane. Quicker release may of course be obtained by the use of suitable springs or fluid pressure acting against the pistons 57.

In order to provide the necessary clearance for the jato unit during the launching operation, the section 62 of track 5, at the launcher, is pivotally carried by the support 34 as indicated at 63 so that it may be swung around into an out-of-the-way position.

Actuator 27 and jacks 30 may be either of the electric or fluid pressure type and a suitable source of electric or fluid pressure energy therefor will preferably be carried by the dolly as indicated at 64. A suitable conventional power source (not shown) will likewise be provided for controlling the actuation of the ram 46.

In setting up a landing field of the character described above, the sections of the landing mat, track, launcher, arresting gear, etc. will be brought into the selected site by suitable trucks or trailers and assembled generally in the relationship as shown in Fig. 1. The aircraft may then be flown in and landed on the mat, and the base is ready for operation.

In landing an aircraft, the plane is flown over the mat somewhat above stall speed at an elevation slightly above the surface of the mat and with its arresting hook 2 lowered into operative position. The arresting cable will be stretched across the approach end of the mat, being held spaced above the mat by the posts 21 which will be in their normal upright position. As soon as the hook engages the arresting cable, the engines of the aircraft will be shut off and the forward velocity of the aircraft will be rapidly slowed by the snubbing action of the arresting gear, the cable 6 paying out in the same fashion as with the conventional arresting gear now in use on aircraft carriers, and the upper end portions 21' of the posts 21 toppling over as shown in Fig. 1 so as to prevent interference with the snubbing action. By proper positioning of the landing hook relative to the center of gravity of the aircraft, the aircraft can be caused to follow a downwardly curving path into the mat such that its forward component of motion will be reduced substantially to zero at the instant it engages the mat, while the aircraft remains substantially in normal flight attitude. Thus the landing shock is distributed over substantially the entire length of the fuselage. The mat, being resilient, will cushion the shock as the airplane drops onto its surface and both the horizontal and vertical decelerations involved will be well within the structural design limits of the airplane and also within safe limits so far as the occupants of the airplane are concerned.

If the pilot misjudges his height no serious results will obtain, since if he is too high, the hook will merely miss the cable and the plane may be flown around for another landing attempt. If he approaches too low, the hook will be cammed up by the ramp 17' into cable engaging position and a substantially normal landing will result.

Figure 6:
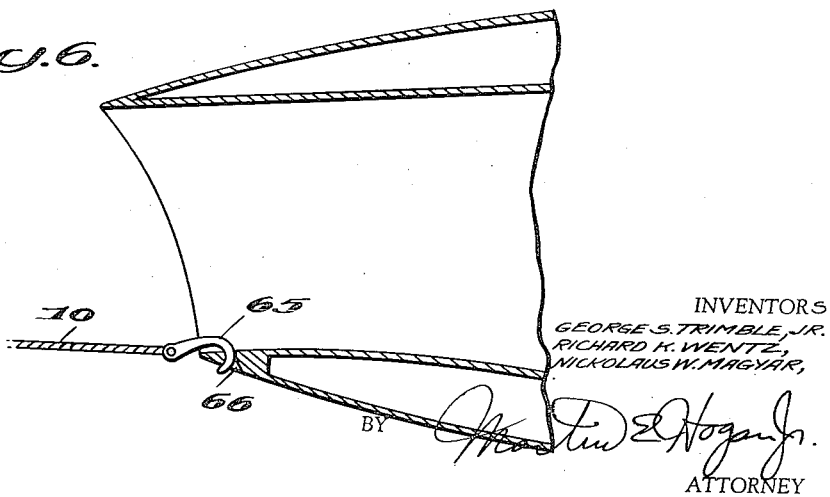
Fig. 6 is a section through the nose portion of the airplane.

As soon as the craft has come to rest on the surface of the mat, cable 10 will be connected to the nose of the aircraft as by engaging its hook 65 in a suitable socket 66 (see Fig. 6), and winch 8 will be actuated to drag the airplane over the remaining length of the mat and onto the cradle of the dolly 7, which will have meanwhile been positioned in alignment with the aircraft. Jacks 30 will then be actuated to raise the cradle, together with the airplane resting thereon, sufficiently to clear the surface of the mat, and the appropriate winch 9 will then be actuated to move the dolly together with the airplane along the track and into position above the selected launching apparatus. The parts will at that time be generally in the position indicated in dash lines in Fig. 3. If necessary, actuator 27 may be operated so as to move the cradle, together with the airplane, transversely of the track so that the holes in the pivot brackets 36 are in vertical alignment with those in the posts 35. Member 38 will then be swung up until stop 48 engages link 44 and ram 46 will be actuated so as to swing the member 38 into position wherein its ends 39 are directly beneath the sockets 41 in the wings. The jacks 30 may then be actuated to lower the plane into the position indicated in dash-dot lines in Fig. 3. Shear pins 37 will then be inserted and ram 46 operated to swing members 44 and 38 into their full line position, shown in Fig. 3.

The dolly may then be moved out from below the airplane without interference and the airplane again lowered into its dash-dot line position for refueling and to facilitate the loading of bombs therein. The jato unit may likewise then be attached to the underportion of the fuselage as shown in Figs. 4 and 5 and the loaded plane again lifted into its launching position by operation of ram 46.

To launch the aircraft, the pilot will first start the normal engines and bring them up to their take-off condition of operation. As soon as the engines are delivering full thrust, the jato unit will be ignited, the additional thrust of the jato unit being sufficient to shear the pins 37. It should be noted that the jato unit employed is capable of delivering sufficient thrust and is directed at such an angle relative to the center of gravity of the aircraft that the vertical component of its thrust is sufficient to support the entire weight of the loaded aircraft. Moreover, the thrust from the normal engines and the unbalanced component of thrust from the jato unit parallel to the longitudinal axis of the aircraft are together sufficient to rapidly accelerate the aircraft so that it will reach a forward velocity sufficient to provide enough aerodynamic lift from the wings to sustain normal flight by the time that the jato burns out. At this time the jato unit will be dropped, as previously explained, and the plane will continue its flight as a conventional airplane.

Figs. 7 and 8 show an alternative form of landing mat which may be substituted for the mat of Fig. 1. In this case, the mat 67 consists of a piece of strong fabric 68, such as canvas or nylon fabric, stretched tautly between a plurality of posts 69 so that it is supported a few feet above the ground. As indicated in Fig. 8, suitable ground anchors 70 and cables 71 will be provided to hold the posts in the desired position and to apply the necessary tension to the fabric mat. Spacer rods 72 may be used to maintain posts 69 in proper spaced relationship. As in the previous case, a generally conventional arresting gear 73 will be provided adjacent one end of the mat. Operation of the system using this type of mat is substantially the same as that previously described.

It can be seen that the above described arrangement provides a base for landing and launching high performance aircraft in a relatively restricted space and at the same time, by eliminating the need for conventional landing gear on the aircraft, permits the use of much smaller and lighter aircraft than would otherwise be necessary to obtain similar performance. Moreover, each unit of the complete base is built up from relatively small components which may be readily transported to and erected at the desired site.

The arrangement is extremely flexible. For example, the number and arrangement of the launchers may obviously be varied as desired, depending upon such factors as the number of aircraft to be handled, the nature of the surrounding terrain, etc. Being small in size, the base presents an extremely poor target for enemy bombers and at the same time lends itself readily to camouflage. Moreover its small size, especially when coupled with the slight amount of ground preparation needed to set up such a base, makes it entirely practical to provide a plurality of such bases, dispersed throughout a given area, each being substantially self sufficient, and collectively able to accommodate a large force of aircraft without undue concentration thereof.

While in the instant case the dolly has been shown as including provision for limited vertical and horizontal adjustment to assist in aligning the airplane with the launcher for transfer thereto, this is merely for illustrative purposes as it is obvious that these same results could be obtained by providing for limited vertical and horizontal adjustment of the posts 35 relative to the rear supports 34. This would of course permit the use of dollys of much simpler and lighter construction since the cradle would be integral with the main frame.

Obviously many other changes and modifications could be made without departing from the spirit and scope of the invention as defined by the appended claims.

We claim as our invention:

1. An airbase for airplanes adapted to land directly on their fuselage comprising an elongated resilient mat, arresting gear adjacent one end thereof and adapted to be engaged by an airplane flying slightly above the level of said mat to quickly decelerate said airplane and bring it to rest on the surface of said mat, a trackway adjacent to and extending transversely across the other end of said mat, the portion thereof opposite said mat being at a lower level than the upper surface of the mat, a dolly adapted to run along said trackway and including a cradle adapted to be brought into substantial alignment with the under portion of an airplane resting on said mat, and means for sliding an airplane longitudinally from said mat onto said cradle and thereafter moving said dolly together with the airplane along said trackway and out of alignment with said mat, said cradle being mounted for limited raising and lowering movement relative to said track, and means for so moving the cradle.

2. An airbase for airplanes adapted to land directly on their fuselage comprising an elongated resilient mat, arresting gear adjacent one end thereof and adapted to be engaged by an airplane flying slightly above the level of said mat to quickly decelerate said airplane and bring it to rest on the surface of said mat, a trackway adjacent to and extending transversely across the other end of said mat, the portion thereof opposite said mat being at a lower level than the upper surface of the mat, a dolly adapted to run along said trackway and including a cradle adapted to be brought into substantial alignment with the under portion of an airplane resting on said mat, a winch having a cable adapted to be detachably connected adjacent the nose portion of an airplane resting on the mat and means substantially in alignment with the center line of said mat for guiding said cable whereby when said winch is actuated said cable will pull the airplane longitudinally off the end of said mat and onto said cradle, and means for moving said dolly along said trackway.

3. An airbase for airplanes adapted to land directly on their fuselage comprising an elongated resilient mat, arresting gear adjacent one end thereof and adapted to be engaged by an airplane flying slightly above the level of said mat to quickly decelerate said airplane and bring it to rest on the surface of said mat, a trackway adjacent to and extending transversely across the other end of said mat, the portion thereof opposite said mat being at a lower level than the upper surface of the mat, a dolly adapted to run along said trackway and including a cradle adapted to be brought into substantial alignment with the under portion of an airplane resting on said mat, and means for moving an airplane longitudinally from said mat onto said cradle and thereafter moving said dolly together with the airplane along said trackway, launching means disposed laterally of said mat and comprising a pair of supports located at opposite sides of said trackway whereby a dolly with an airplane thereon may be moved to a position on said trackway adjacent said supports for transfer of said airplane to said supports, one of said supports including means for elevating said airplane from a normal substantially horizontal position resting on said dolly to an upwardly and forwardly inclined, launching attitude free of said dolly, whereupon the dolly may be moved from beneath said airplane.

4. An airbase for airplanes adapted to land directly on their fuselage comprising an elongated resilient mat, arresting gear adjacent one end thereof and adapted to be engaged by an airplane flying slightly above the level of said mat to quickly decelerate said airplane and bring it to rest on the surface of said mat, a trackway adjacent to and extending transversely across the other end of said mat, the portion thereof opposite said mat being at a lower level than the upper surface of the mat, a dolly adapted to run along said trackway and including a cradle adapted to be brought into substantial alignment with the under portion of an airplane resting on said mat, and means for moving an aircraft from said mat onto said cradle and thereafter moving said dolly together with the airplane along said trackway, launching means for said airplane including a pair of front and rear supports on opposite sides of said trackway, said trackway inclining upwardly from said portion opposite the mat to an elevated level adjacent said launching means such that an airplane resting on a dolly on said trackway may be moved into a position directly over said supports, said front support including elevating means adapted to engage the forward portion of said airplane, and means including said elevating means for transferring said airplane from said dolly to said supports and for elevating it into an upwardly and forwardly inclined launching position extending transversely across said trackway.

5. An airbase for airplanes adapted to land directly on their fuselage comprising an elongated resilient landing mat and means to bring an airplane to rest on the surface of the mat, a trackway adjacent to and extending transversely across one end of said mat, the portion thereof opposite said mat being at a lower level than the upper surface of the mat, a dolly adapted to run along said trackway and including a cradle adapted to be brought into substantial alignment with the under portion of an airplane resting on said mat, and means for moving an airplane longitudinally from said mat onto said cradle and thereafter moving said dolly together with the airplane along said trackway, launching means disposed laterally of said mat and comprising a pair of supports at opposite sides of said trackway, said trackway inclining upwardly from the portion adjacent said mat to an elevated portion between said supports whereby a dolly with an airplane thereon may be moved to a position on said elevated portion for transfer of said airplane to said supports, one of said supports including means for elevating said airplane from a normal, substantially horizontal position resting on said dolly to an upwardly and forwardly inclined launching attitude free of said dolly, whereupon the latter may be moved from beneath said airplane, said track including a second portion beyond said launcher, inclined downwardly from said elevated level to substantially ground level whereby said dolly may be removed entirely from said trackway for movement along the ground.

6. An airbase for airplanes adapted to land directly on their fuselage comprising an elongated resilient landing mat and means to bring an airplane to rest on the surface of said mat, a trackway adjacent to and extending transversely across one end of said mat, a dolly adapted to run along said trackway and including a cradle adapted to support an airplane with its longitudinal axis transversely of said trackway, and means for transferring an airplane from said mat onto said cradle and thereafter moving said dolly together with the airplane along said trackway, launching means off-set laterally from said mat and comprising a pair of supports on opposite sides of said track adapted to receive an airplane from said dolly and support it in an upwardly and forwardly inclined launching position, and auxiliary thrust producing means adapted to be detachably secured to said airplane so that its line of thrust passes substantially through the center of gravity of the airplane, and is inclined downwardly and rearwardly therefrom so that the vertical component of thrust therefrom will slightly exceed the entire weight of the airplane including said auxiliary thrust producing means and whereby the unbalanced components of thrust parallel to the longitudinal axis of said airplane will cause said airplane to accelerate rapidly in the direction of said axis until normal flying speed is reached.

7. An airbase for airplanes comprising a trackway, a dolly adapted to run along said trackway and including a cradle adapted to support an airplane thereon with its longitudinal axis extending transversely of said trackway, launching means comprising a pair of supports on opposite sides of said track adapted to receive an airplane from said dolly and support it in an upwardly and forwardly inclined launching position, and auxiliary thrust producing means adapted to be detachably secured to said airplane so that its line of thrust passes substantially through the center of gravity of the airplane, and is inclined downwardly and rearwardly therefrom so that the vertical component of thrust therefrom will slightly exceed the entire weight of the airplane including said auxiliary thrust producing means, whereby the unbalanced components of thrust parallel to the longitudinal axis of said airplane will cause said airplane to accelerate rapidly in the direction of said axis until normal flying speed is reached, said auxiliary thrust producing means projecting below the rear portion of said airplane to a level below the adjacent track portion and said adjacent track portion being mounted for movement from its normal position into a position out of the path of motion of said thrust producing means during the launching operation.

8. An airbase for airplanes adapted to land directly on their fuselage comprising an elongated resilient mat, arresting gear adjacent one end thereof and adapted to be engaged by an airplane flying slightly above the level of said mat to quickly decelerate said airplane and bring it to rest on the surface of said mat, a trackway adjacent to and extending transversely across the other end of said mat, the portion thereof opposite said mat being at a lower level than the upper surface of the mat, a dolly adapted to run along said trackway and including a cradle adapted to be brought into substantial alignment with the under portion of an airplane resting on said mat, and means for moving an airplane longitudinally from said mat onto said cradle and thereafter moving said dolly together with the airplane along said trackway, launching means disposed laterally of said mat and comprising a pair of supports located at opposite sides of said trackway whereby a dolly with an airplane thereon may be moved to a position on said trackway adjacent said supports for transfer of said airplane to said supports.

References Cited in the file of this patent
UNITED STATES PATENTS

| | | |
|---|---|---|
| 1,739,193 | Ward | Dec. 10, 1929 |
| 1,902,205 | Webster | Mar. 21, 1933 |
| 2,125,904 | Fellers | Aug. 9, 1938 |
| 2,425,886 | Knox | Aug. 19, 1947 |
| 2,436,240 | Wiertz | Feb. 17, 1948 |